United States Patent [19]

Burri et al.

[11] Patent Number: 5,002,790

[45] Date of Patent: Mar. 26, 1991

[54] PROTECTION OF A FOOD AGAINST OXIDATION BY THE USE OF VANILLIN

[75] Inventors: Josef Burri, Epalinges; Manfred P. Graf, Blonay; Pierre Lambelet, Saint-Legier; Jürg Loeliger, Corseaux, all of Switzerland

[73] Assignee: Nestec S.A., Vevey, Switzerland

[21] Appl. No.: 340,850

[22] Filed: Apr. 20, 1989

[30] Foreign Application Priority Data

May 6, 1988 [CH] Switzerland ............... 1715/88

[51] Int. Cl.$^5$ ............................................. A23L 1/221
[52] U.S. Cl. .................................... 426/544; 426/650
[58] Field of Search ............. 426/541, 544, 542, 543, 426/534, 650; 260/398.5; 252/397, 398, 399

[56] References Cited

U.S. PATENT DOCUMENTS

| 2,064,610 | 12/1936 | Hunt | 260/398.5 |
|---|---|---|---|
| 2,282,810 | 5/1942 | Musher | 260/398.5 |
| 2,861,890 | 11/1958 | Lockhead | 426/544 |
| 3,686,001 | 8/1972 | Christianson . | |

FOREIGN PATENT DOCUMENTS 3503505  8/1986  Fed. Rep. of Germany .

OTHER PUBLICATIONS

Burri 1989 J Sci Food Agric 48:49–56.
Pruthi 1980 Spices and Condiments Chemistry, Microbiology, Technology Academic Press New York p. 23.
Bickoff, Phenolic Antioxidants for Carotene, J. Am. Oil Chem, Soc. Feb. 1951 pp. 65–68.
Narayanan, Effect of Vanillinon Stabiltiy of Vegetable Shortening (1957) pp. 245–248.
Derwent Abstract No. 79-00844B.
Derwent Abstract 76-76956X.
Derwent Abstract 72-42192T.
Food Science & Tech. Abstract 70-60-T0204.

*Primary Examiner*—Carolyn Paden
*Attorney, Agent, or Firm*—Vogt & O'Donnell

[57] ABSTRACT

To protect a dry food against oxidation, vanillin is added to it in a quantity of 5 to 5000 μg vanillin per g food dry matter.

12 Claims, No Drawings

PROTECTION OF A FOOD AGAINST OXIDATION BY THE USE OF VANILLIN

BACKGROUND OF THE INVENTION

This invention relates to a process for the protection of a food against oxidation and to the use of vanillin for this purpose.

Vanillin is known for its strong flavouring power. It is thus used in known manner as an agent for flavouring foods, such as creams, ice creams or chocolates for example.

It is also known that certain fat-soluble derivatives of vanillin, particularly certain vanillyl acylamides, may be used for the protection of foods against oxidation.

However, it has never been proposed to use vanillin as such for the protection of foods against oxidation. This is because vanillin shows hardly any solubility in fats.

SUMMARY OF THE INVENTION

The object of the present invention is to provide a process for the effective protection of a food using a substance generally accepted as innocuous to the human organism.

To this end, the process for the protection of a food against oxidation is characterized in that vanillin is added to the food in a quantity of 5 to 5000 µg per g food dry matter.

The present invention also relates to the use of vanillin for the protection of a food against oxidation in a quantity of 5 to 5000 µg vanillin per g food dry matter.

It has surprisingly been found that vanillin lends itself as such to use as an antioxidant in foods and that it provides as such for the effective protection of foods against oxidation in the concentrations indicated.

If less than 5 µg vanillin is added per g food dry matter, the food is in danger of being inadequately protected against oxidation. If more than 5000 µg is added, the protection afforded may be no greater than that obtained by adding quantities within the indicated range.

DETAILED DESCRIPTION OF THE INVENTION

In the context of the present invention, the term vanillin is understood to encompass each of the substances of identical or similar formulae which are known for their flavouring power characteristic of vanilla, more especially the active principle of an extract of VANILLA PLANIFOLIA ANDR. (ORCHIDACEA), namely 3-methoxy-4-hydroxybenzaldehyde, the compound synthetized from eugenol or lignin which has the same structure, or 3-ethoxy-4-hydroxybenzaldehyde.

Accordingly, to carry out the process according to the invention or for the use according to the invention, it is possible to use a natural extract containing vanillin, a purified natural vanillin or a synthetic vanillin. It is preferred to use purified vanillin, for example in the form of a fine powder or alcoholic solution.

The vanillin may be added to the food by thorough mixing with the food during or after its production. This presupposes that the food or its constituents are preferably in subdivided, dry, pasty or liquid form during or after production.

In view of the volatility of vanillin, its thorough mixing with the food is preferably carried out at a relatively moderate temperature with no excessive heat treatment thereafter.

Thus, the thorough mixing step is preferably carried out by dry mixing, after drying, in the production of dehydrated flakes, for example, by the cylinder drying of an aqueous suspension of food material.

The fact that vanillin effectively affords protection of a food against oxidation by simple final dry addition in powder form is one of the most surprising aspects of the present invention.

EXAMPLES

The following Examples, in which the percentages are by weight, are intended to illustrate the process and the use according to the invention.

EXAMPLE 1

To prepare dehydrated precooked cereal flakes, grains of whole wheat are ground the day before in a hammer mill. Four batches of an aqueous dispersion of 5 kg wheat flour in 20 kg water are prepared.

Each batch is heat-treated for 60 s at 130° C. in a scraped-surface heat exchanger and is then immediately dried for 10 s on a two-cylinder dryer heated with steam at 4 bar to a residual moisture content of 3.4–3.8%. Four batches of cereal flakes are thus obtained.

One batch is kept without vanillin for comparison. 100 µg vanillin powder per g flakes are added dry with thorough stirring to the second batch, 200 µg vanillin powder per g flakes to the third batch and 500 µg vanillin powder per g flakes to the fourth batch.

The four batches are subjected to the following oxidation test:

Oxidation test

The cereal flakes are placed in 400 ml lacquered tin-plate cans in an amount of 40 g flakes per batch per can. The cans are then hermetically sealed and stored at 30° C.

The gases in the head space of the cans containing the sample flakes of the four batches are analyzed after 1, 2 and 3 months by determination of the pentane content, pentane being a by-product of the degradation of lineoleic acid by oxidation, and the residual oxygen content. The pentane content (in M pentane in 5 ml head space gas at 1013 mbar) is determined by gas-phase chromatography and the residual oxygen content (in % head space gas) by measurement of the paramagnetic susceptibility.

The results of this test are shown in Table I below:

TABLE I

| | Storage period | | | | | |
| | 1 month | | 2 months | | 3 months | |
| Samples | pentane ($10^{-9}$ M) | $O_2$ (%) | pentane ($10^{-9}$ M) | $O_2$ (%) | pentane ($10^{-9}$ M) | $O_2$ (%) |
| Without vanillin (comparison) | 4.3 | 18.8 | 9.1 | 17.6 | 13 | 16.4 |
| With 100 µg/g vanillin | 4.2 | 18.4 | 7.5 | 17.4 | 8 | 17.3 |
| With 200 µg/g vanillin | 3.2 | 18.5 | 4.8 | 17.6 | 6 | 17.3 |
| with 500 µg/g | 1.0 | 18.8 | 1.4 | 18.2 | 1.6 | 18 |

It can be seen that, after storage for only one month at 20° C., there is already a difference between the comparison sample and the samples containing vanillin, the difference being more pronounced, the larger the quantity of vanillin added. After 2 and 3 months, the reduction in the production of pentane and in the consumption of oxygen as a result of the addition of vanillin, i.e., the reduction in oxidation, is very clear.

EXAMPLE 2

Four batches of cereal flakes are prepared from whole rice in the same way as described in Example 1. The flakes thus produced have a residual moisture content of 3.9%.

One batch is kept without vanillin for comparison. Respective quantities of 50 μg, 500 μg and 5000 μg vanillin per g flakes of the second, third and fourth batches are added dry with thorough stirring. The four batches are oxidation-tested at 37° C. in the same way as described in Example 1 and are then tasted by specialists in a test based on the odour emitted by the samples. The scale of marks awarded extends from 1 to 9, 1 representing a very heavily oxidized product, 9 an excellent, fresh product and 5 the limit of acceptability.

The results of these tests are shown in Table II below:

TABLE II

| Samples | Storage period | | | | | | | | |
|---|---|---|---|---|---|---|---|---|---|
| | 3 months | | | 4 months | | | 6 months | | |
| | pentane ($10^{-9}$ M) | $O_2$ (%) | taste | pentane ($10^{-9}$ M) | $O_2$ (%) | taste | pentane ($10^{-9}$ M) | $O_2$ (%) | taste |
| Without vanillin (comparison) | 2.9 | 20.0 | 6.3 | 6.3 | 19.8 | 6 | | | 5.3 |
| With 50 μg/g vanillin | 1.7 | 20.5 | 7.7 | 1.7 | 20.2 | 7.5 | 3.1 | 19.5 | 7.3 |
| With 500 μg/g vanillin | 0.0 | 20.3 | 6.7 | 0.7 | 19.9 | 5 | 1.0 | 19.7 | 6.3 |
| With 5000 μg/g vanillin | 0.5 | 20.3 | 6.0 | 4.3 | 20.1 | 5.3 | 0.9 | 19.8 | 6.0 |

It can be seen that all the results of the oxidation tests are conclusive while the tasting tests give corresponding results in the majority of cases.

EXAMPLE 3

Four batches of cereal flakes are prepared from whole oats in the same way as described in Example 1. The flakes thus prepared have a residual moisture content of 1.7%.

One batch is kept without vanillin for comparison. Respective quantities of 50 μg, 500 μg and 5000 μg of vanillin per g flakes of the second, third and fourth batches are added dry with thorough stirring.

The four batches are oxidation-tested at 37° C. in the same way as described in Example 1 and then tested for taste in the same way as described in Example 2.

The results of these tests are shown in Table III below.

TABLE III

| Samples | Storage period | | | | | | | | |
|---|---|---|---|---|---|---|---|---|---|
| | 3 months | | | 4 months | | | 6 months | | |
| | pentane ($10^{-9}$ M) | $O_2$ (%) | taste | pentane ($10^{-9}$ M) | $O_2$ (%) | taste | pentane ($10^{-9}$ M) | $O_2$ (%) | taste |
| Without vanillin (comparison) | 3.4 | 19.8 | 6 | 77.2 | 9.4 | 2 | | | 1 |
| With 50 μg/g vanillin | 6.2 | 19.4 | 5.3 | 48.8 | 11.3 | 1 | | | 1 |
| With 500 μg/g vanillin | 1.1 | 20.3 | 6 | 2.1 | 19.7 | 5.7 | 4.2 | 18.7 | 5.3 |
| With 5000 μg/g vanillin | 0.5 | 20.3 | 5.0 | 0.5 | 19.9 | 5 | 2.3 | 19.3 | 5.7 |

It can be seen that the flakes without vanillin are heavily oxidized on account of the relatively high fat content of oats. The antioxidant effect of adding vanillin is the more clearly apparent insofar as it is demonstrated both by the oxidation test and by the tasting test.

EXAMPLE 4

To prepare dehydrated precooked cereal flakes, an aqueous dispersion of 500 kg oatmeal is prepared using such a quantity of water that the dispersion has a dry matter content of 40%.

The dispersion is heat-treated for 60 s at 130° C. by injection of steam and is dried on a cylinder to a residual moisture content of 3.4%.

After taking some samples of flakes to be kept as such for comparison, 200 μg vanillin are added per g cereal flakes thus obtained.

The flakes are subjected to keeping tests in lacquered tinplate cans. Tastings by specialists after 2, 4 and 8 months reveal a considerable slowing down of the oxidative degradation of the flakes to which vanillin was added compared with the samples to which it was not added.

We claim:

1. A process for protecting a dry food against oxidation which comprises mixing vanillin with a subdivided dry food in an amount of 5 μg to 5000 μg vanillin per gram of dry good matter for protecting the dry food against oxidation.

2. A process according to claim 1 wherein the vanillin mixed with the dry food is in powder form.

3. A process according to claim 1 wherein the vanillin mixed with the dry food is in an alcoholic solution.

4. A process according to claim 1 wherein the dry food is cereal flakes.

5. A process according to claim 1 wherein the vanillin is comprised of 3-methoxy-4-hydroxybenzaldehyde.

6. A process according to claim 1 wherein the vanillin is comprised of 3-ethoxy-4-hydroxybenzaldehyde.

7. A process for protecting a dry food against oxidation which comprises producing a subdivided dry food and mixing vanillin with the dry food in an amount of 5 µg to 5000 µg vanillin per gram of dry food matter for protecting the dry food against oxidation.

8. A process according to claim 7 wherein the vanillin mixed with the dry food is in powder form.

9. A process according to claim 7 wherein the vanillin mixed with the dry food is in an alcoholic solution.

10. A process according to claim 7 wherein the dry food is cereal flakes.

11. A process according to claim 7 wherein the vanillin is comprised of 3-methoxy-4-hydroxybenzaldehyde.

12. A process according to claim 7 wherein the vanillin is comprised of 3-ethoxy-4-hydroxybenzaldehyde.

* * * * *